(12) United States Patent
Müller et al.

(10) Patent No.: US 10,865,778 B2
(45) Date of Patent: Dec. 15, 2020

(54) METHOD FOR ASCERTAINING A VALUE OF AN ICE BUILDUP QUANTITY ON AT LEAST ONE ROTOR BLADE OF A WIND TURBINE, AND USE THEREOF

(71) Applicant: FOS4X GMBH, Munich (DE)

(72) Inventors: Mathias Müller, Munich (DE); Thomas Schauss, Gilching (DE); Florian Rieger, Munich (DE)

(73) Assignee: FOS4X GMBH, Munich (DE)

( * ) Notice: Subject to any disclaimer, the term of this patent is extended or adjusted under 35 U.S.C. 154(b) by 53 days.

(21) Appl. No.: 16/066,821

(22) PCT Filed: Dec. 5, 2016

(86) PCT No.: PCT/EP2016/079759
§ 371 (c)(1),
(2) Date: Jun. 28, 2018

(87) PCT Pub. No.: WO2017/114638
PCT Pub. Date: Jul. 6, 2017

(65) Prior Publication Data
US 2018/0372075 A1      Dec. 27, 2018

(30) Foreign Application Priority Data
Dec. 29, 2015 (DE) .................. 10 2015 122 933

(51) Int. Cl.
*F03D 17/00* (2016.01)
*F03D 80/40* (2016.01)

(52) U.S. Cl.
CPC ............. *F03D 80/40* (2016.05); *F03D 17/00* (2016.05); *F05B 2270/334* (2013.01); *Y02E 10/72* (2013.01)

(58) Field of Classification Search
CPC ..... F03D 80/40; F03D 17/00; F05B 2270/334
See application file for complete search history.

(56) References Cited

U.S. PATENT DOCUMENTS

| | | | | |
|---|---|---|---|---|
| 6,890,152 B1* | 5/2005 | Thisted | ............... | F03D 80/40 416/1 |
| 7,086,834 B2* | 8/2006 | LeMieux | ............... | F03D 7/02 416/1 |
| 7,883,319 B2* | 2/2011 | Volkmer | ............... | F03D 17/00 416/146 R |
| 8,434,360 B2* | 5/2013 | Cheng | ............... | F03D 80/40 73/170.26 |
| 9,041,233 B2* | 5/2015 | Martin Ramos | ........ | F03D 80/40 290/44 |
| 9,133,828 B2* | 9/2015 | Egedal | ............... | F03D 7/042 |
| 9,638,168 B2* | 5/2017 | Castro | ............... | F03D 7/0224 |
| 2010/0158688 A1* | 6/2010 | Benito | ............... | F03D 80/40 416/39 |
| 2010/0189560 A1* | 7/2010 | Haraguchi | ............ | F03D 7/0212 416/1 |
| 2012/0175878 A1* | 7/2012 | Wickstrom | ............ | F03D 80/40 290/44 |
| 2012/0207589 A1* | 8/2012 | Fridthjof | ................ | B64D 15/20 415/121.3 |
| 2012/0253697 A1* | 10/2012 | Frankenstein | ..... | G05B 23/0254 702/39 |
| 2013/0078093 A1* | 3/2013 | Miranda | ............... | F03D 7/0224 416/1 |
| 2013/0106108 A1* | 5/2013 | De Boer | ................ | F03D 7/045 290/44 |
| 2013/0195657 A1 | 8/2013 | Lauritsen et al. | | |
| 2013/0272874 A1* | 10/2013 | Hess | ..................... | F03D 7/0224 416/1 |
| 2014/0072429 A1* | 3/2014 | Krainer | ................ | H01L 23/345 416/1 |
| 2015/0023792 A1* | 1/2015 | Spitzner | .................. | F03D 80/40 416/1 |
| 2015/0110624 A1* | 4/2015 | Zhou | ..................... | F03D 7/0224 416/1 |
| 2016/0025069 A1* | 1/2016 | Hilling | ................... | F03D 80/40 416/1 |
| 2016/0040654 A1* | 2/2016 | Cuoghi | ................ | F03D 1/0675 416/1 |
| 2017/0058871 A1* | 3/2017 | Movsichoff | ............ | F03D 80/40 |

(Continued)

FOREIGN PATENT DOCUMENTS

| DE | 102013202261 A1 | 8/2014 |
|---|---|---|
| DE | 102013221401 A1 | 4/2015 |

(Continued)

OTHER PUBLICATIONS

German Patent Examination Report dated Sep. 8, 2016 for Patent Application No. 10 2015 122 933.1.

(Continued)

*Primary Examiner* — Aaron R Eastman
*Assistant Examiner* — Theodore C Ribadeneyra
(74) *Attorney, Agent, or Firm* — Moser Taboada

(57) ABSTRACT

Embodiments of the invention describe a method for ascertaining a value of an ice buildup quantity on at least one rotor blade (111, 112) of a wind turbine (100) and to the use thereof. The method has the steps of ascertaining a base value (G) for at least one natural frequency of the rotor blade when vibrations are excited in an ice buildup-free state; ascertaining a shift base factor for shifting the at least one natural frequency relative to the ice buildup-free state in the event of an ice buildup quantity which is increased by a specific value; detecting a measurement value or a measurement value curve of a measurement variable which is suitable for determining the current natural frequency of the rotor blade (111, 112); determining the current natural frequencies of the rotor blade (111, 112); and deriving a current shift factor by comparing the current natural frequencies with the base value (G), comparing the current shift factor with the shift base factor, and deriving a value for the ice buildup quantity using the comparison.

11 Claims, 3 Drawing Sheets

(56) References Cited

U.S. PATENT DOCUMENTS

2017/0218926 A1* 8/2017 Draper .................... F03D 80/40
2017/0226990 A1* 8/2017 Arlaban Gabeiras ... F03D 17/00
2017/0335828 A1* 11/2017 Muller .................. G01P 15/093

FOREIGN PATENT DOCUMENTS

| DE | 102013223294 A1 | 5/2015 |
| EP | 1466827 A2 | 10/2004 |
| EP | 2588752 A2 | 5/2013 |

OTHER PUBLICATIONS

International Search Report and Written Opinion dated Mar. 2, 2017 for PCT Application No. PCT/EP2016/079759.

\* cited by examiner

METHOD FOR ASCERTAINING A VALUE OF AN ICE BUILDUP QUANTITY ON AT LEAST ONE ROTOR BLADE OF A WIND TURBINE, AND USE THEREOF

TECHNICAL FIELD

Embodiments of the present disclosure relate to a method for determining a value for an ice buildup quantity on at least one rotor blade of a wind turbine, and the use of a method for determining a value for an ice buildup quantity on at least one rotor blade of a wind turbine.

Rotor blades of wind turbines are exposed to the weather conditions of the surroundings without protection. At certain locations, ice may accumulate at the rotor blades in the case of appropriately low ambient temperatures and sufficiently high humidity, or if precipitation occurs. As the size of the rotor blades of wind turbines increases, so does their surface area, and so the risk of an accumulation of ice, i.e. the formation of an ice buildup on the rotor blades, increases as well.

Firstly, ice buildup constitutes a potential hazard for the surroundings of the wind turbine since dropped ice pieces can endanger persons and objects in the drop radius if the ice buildup is dropped—be it during operation or standstill of the installation. Secondly, an imbalance of the rotor of the wind turbine may also arise, particularly in the case of a non-uniform accumulation of ice, possibly leading to damage during operation of the wind turbine.

Knowledge about the mass of accumulated ice on a rotor blade may be expedient and necessary for different purposes. By way of example, if the mass of the ice buildup is known, it is possible to verify whether a rotor blade de-icing device is functional or whether a de-icing strategy for the removal of ice is sufficient. Moreover, it may be desirable to carry out a comparison of the quantity of the respectively occurring ice buildup in the case of a plurality of wind turbines that are operated under similar ambient conditions and optionally to undertake appropriate optimization measures on the wind turbines.

PRIOR ART

Evaluating data of a wind turbine in order to deduce the hazard of an already occurred accumulation of ice is known. DE 10 2005 016 524 A1 discloses a method for identifying ice on a wind turbine, in which there is monitoring both of meteorological conditions that are related to icing states and of one or more physical, characteristic variables of the wind turbine during operation that allow a change in mass of the rotor blades of the wind turbine to be deduced.

The known methods are disadvantageous in that, for example, it is only possible to qualitatively identify an already present ice buildup; specifying a quantity of the ice buildup is not provided in the conventional methods.

Therefore, the intention is to provide a solution that allows a reliable determination of a value for an ice buildup quantity on at least one rotor blade of the wind turbine.

SUMMARY

Embodiments of the present disclosure provide a method for determining a value for an ice buildup quantity on at least one rotor blade of a wind turbine according to claim 1. Further, embodiments of the present disclosure specify the use of a method described herein for determining the operating parameters of a rotor blade de-icing device that are required for a de-icing process according to claim 9. Moreover, embodiments of the present disclosure specify the use of a method described herein for a plurality of wind turbines of a wind farm according to claim 10.

According to one embodiment, a method for determining a value for an ice buildup quantity on at least one rotor blade of a wind turbine is specified, said method including determining a base value for at least one natural frequency of the rotor blade when vibrations are excited in an ice-buildup-free state; determining a shift base factor for a shift of the at least one natural frequency in relation to the ice-buildup-free state in the case of an ice buildup quantity that has been increased by a specific value; capturing a measurement value or a measurement value curve of a measurement variable that is suitable for identifying the current natural frequencies of the rotor blade, and identifying the current natural frequencies of the rotor blade; deriving a current shift factor by comparing the current natural frequencies to the base value, comparing the current shift factor to the shift base factor, and deriving a value for the ice buildup quantity on the basis of the comparison.

According to a further embodiment, the use of a method for determining a value for an ice buildup quantity on at least one rotor blade of a wind turbine for determining the operating parameters of a rotor blade de-icing device that are required for a de-icing process is specified, wherein the method comprises: determining a base value for at least one natural frequency of the rotor blade when vibrations are excited in an ice-buildup-free state; determining a shift base factor for a shift of the at least one natural frequency in relation to the ice-buildup-free state in the case of an ice buildup quantity that has been increased by a specific value; capturing a measurement value or a measurement value curve of a measurement variable that is suitable for identifying the current natural frequencies of the rotor blade, and identifying the current natural frequencies of the rotor blade; deriving a current shift factor by comparing the current natural frequencies to the base value, comparing the current shift factor to the shift base factor, and deriving a value for the ice buildup quantity on the basis of the comparison.

According to a further embodiment, the use of a method for determining a value for an ice buildup quantity on at least one rotor blade of a wind turbine for a plurality of wind turbines of a wind farm is specified, wherein the method comprises: determining a base value for at least one natural frequency of the rotor blade when vibrations are excited in an ice-buildup-free state; determining a shift base factor for a shift of the at least one natural frequency in relation to the ice-buildup-free state in the case of an ice buildup quantity that has been increased by a specific value; capturing a measurement value or a measurement value curve of a measurement variable that is suitable for identifying the current natural frequencies of the rotor blade, and identifying the current natural frequencies of the rotor blade; deriving a current shift factor by comparing the current natural frequencies to the base value, comparing the current shift factor to the shift base factor, and deriving a value for the ice buildup quantity on the basis of the comparison; determining the respective value for the ice buildup quantity at each wind turbine of the plurality of wind turbines; comparing the values; and determining a hazard indicator for an ice buildup for at least one wind turbine of the plurality of wind turbines from the comparison.

BRIEF DESCRIPTION OF THE DRAWINGS

Embodiments of the invention are illustrated in the drawings and explained in more detail in the following description. In the drawings.

Embodiments of the invention are explained in more detail below. The drawings serve to illustrate one or more examples of embodiments of the invention.

Figure 1:
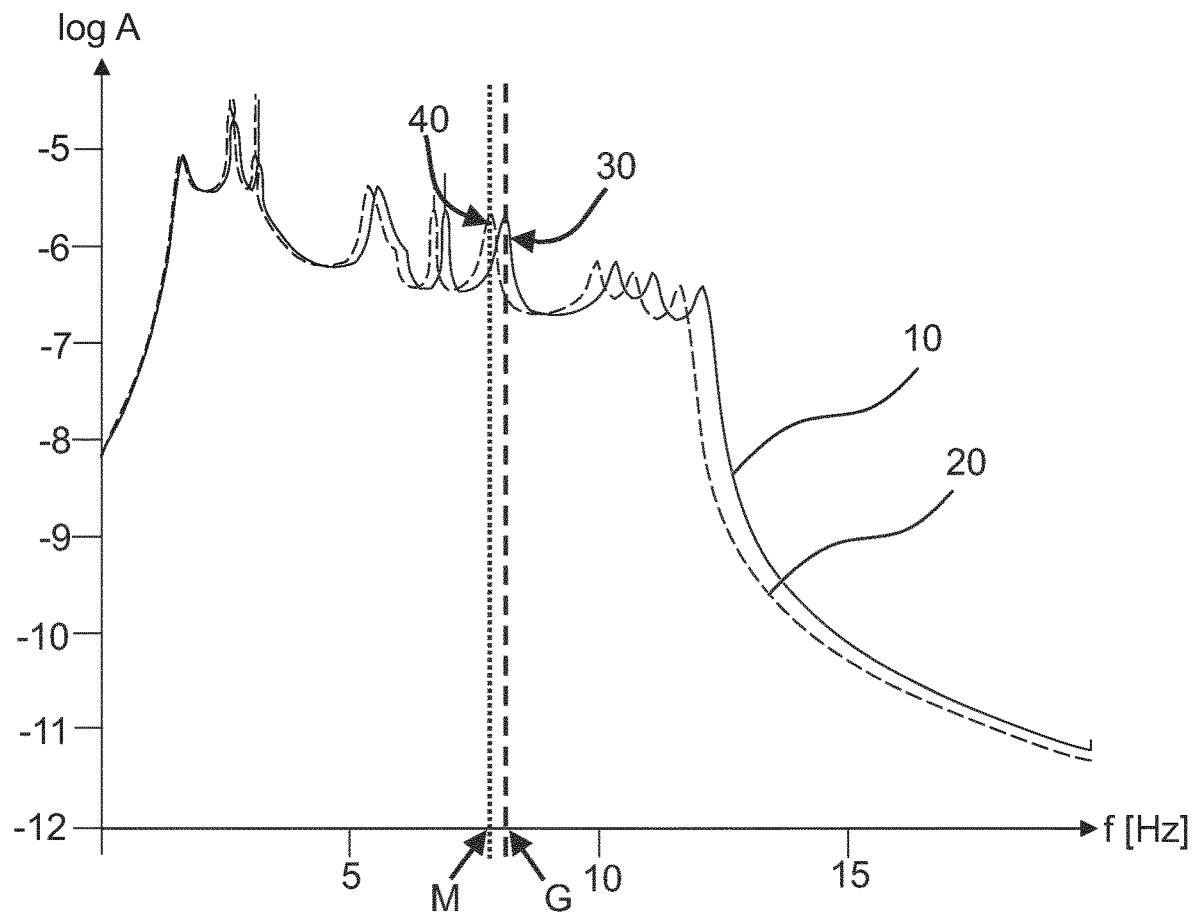
FIG. 1 shows a diagram of the logarithm of the amplitude of rotor blade vibrations against the frequency for explaining a method for determining a value for an ice buildup quantity on at least one rotor blade of a wind turbine according to an embodiment of the invention.

FIG. 1 illustrates a diagram which plots the curve of the logarithm of the amplitude of rotor blade vibrations as a function of frequency. A first curve 10 shows the amplitude curve for a vibration excitation of a rotor blade in the ice-buildup-free state; a second curve 20 shows the amplitude curve for a vibration excitation where the rotor blade mass has been increased by 100 kg.

In the diagram, the natural frequencies of the respective vibration excitations are visible as peaks. One of the peaks, which is assignable to a natural frequency, is used for the described method in the embodiment; however, it is also conceivable to use a plurality of the natural frequencies.

In the embodiment, a base value G for the natural frequency is identified, typically in the maximum (in the vertex) of the associated peak 30 of the first curve 10, like in the present example as well, by capturing the measurement value curve of a vibration measurement and by way of a subsequent suitable transformation into the frequency domain, for example by way of a Fourier transform or any other suitable integral transformation. However, the base value can also be determined by a simulation of the natural frequency of the rotor blade in the ice-buildup-free state in other embodiments.

In the embodiment, a shift base factor for a shift of the at least one natural frequency, which occurs in the case of an ice buildup quantity that has been increased by a certain amount, is likewise identified. In the diagram illustrated in FIG. 1, the vertex of the peak 40 of the second curve 20 belonging to the considered natural frequency shifts by a certain value to a lower frequency, namely to the value M. It is possible to determine the shift base factor of the considered natural frequency by relating the peak 40 to the peak 30. In the present embodiment, this shift base factor is assigned to an increase in the rotor blade mass by 100 kg.

In the embodiment, the curve of a vibration measurement on a vibration-excited rotor blade with a mass that has been increased by 100 kg, the defined test mass, is captured by measurement and subjected to suitable transformation to the frequency domain, for example a Fourier transform or any other suitable integral transformation, for determining the curve profile of the curve 20. From this, it is possible to determine the shift base factor. However, in other embodiments, the shift base factor can also be determined by a simulation of the natural frequency of the rotor blade in the state which has been increased by the defined test mass.

Using the determined base value and the determined shift base factor, a measurement value or measurement value curve of a measurement variable that is suitable for identifying the current natural frequencies of the rotor blade is determined in the embodiment. In embodiments, the measurement variable is a vibration curve in or on the rotor blade, and the current natural frequencies are derived from a frequency characteristic of the vibration curve.

According to the described embodiment, the current natural frequencies of the rotor blade are identified. A current shift factor is derived by comparing the current natural frequencies to the base value. The current shift factor is compared to the shift base factor and a value for the ice buildup quantity is derived on the basis of the comparison.

Typically, the vibrations in or on the rotor blade are measured, once again, to this end, and the vibration curve is subjected to a suitable integral transformation. Subsequently, the peak of the associated natural frequency and/or the peaks of the associated natural frequencies, for which the shift base factor was determined, is/are related to the original natural frequency or the original natural frequencies, and so a current shift factor of the relevant peak is obtained in relation to the peak of the base value. A value for the ice buildup quantity can be derived from this current shift factor by comparison with the shift base factor.

The methods described herein have an advantage to the effect of, for example, it being possible not only to qualitatively recognize an ice buildup but also to quantitatively determine the quantity of ice buildup. The determination accuracy in the methods described herein is typically better than 50 kg, often better than 20 kg. In the methods described herein, the determination accuracy can lie in the region of 10 kg or better.

The derived value for the ice buildup quantity can be output, for example. Alternatively, or additionally, it can also be used for automated tasks, for example, e.g. for controlling or regulating the wind turbine or installation parts thereof.

In embodiments, the determined value of the increased ice buildup quantity is 50 kg or less, preferably 20 kg or less, particularly preferably approximately 10 kg. This can contribute to a simple measurement setup, particularly when determining the shift base factor using measurement technology.

In embodiments, the measurement variable is captured at a plurality of measurement points or in a plurality of measurement regions on or in the rotor blade. The plurality of measurement points or the plurality of measurement regions can be selected in a suitable manner in order to cover a region of the rotor blade that is as large as possible. However, it is also conceivable to capture the measurement variable at a smaller number of measurement points or measurement regions, or else only at a single measurement point or measurement region, for example in regions or in a region which, either empirically or by simulation, is/are particularly suitable for identifying the natural frequency.

In embodiments, the method further includes setting a threshold value that specifies the maximum possible ice buildup quantity on the rotor blade; determining whether or not the derived value for the ice buildup quantity exceeds the threshold value; and if the threshold value being exceeded is determined: determining that an erroneous value was determining for the value of the ice buildup.

By way of example, such an erroneous value can arise if additional or alternative influences have been incorporated into the value. By way of example, such influences may lie in damage to the rotor blade, may occur in the case of lightning strike, or the like. A plausibility check of the value for the ice buildup can be undertaken in the case of the suitable selection of the threshold value.

In embodiments, one value for the ice buildup quantity is determined in each case on at least two rotor blades of the wind turbine. The method then further includes comparing the values for the respective ice buildup quantity; and determining by means of the comparison whether or not the imbalance of the rotor of the wind turbine exceeds a value that is set or settable in advance.

By way of example, the comparison may comprise the formation of a difference between the values for the respective ice buildup quantity. An imbalance can be deduced from the comparison, for example if the difference exceeds a certain admissible imbalance threshold value.

An imbalance represents a particular hazard for the installation; by way of the determination according to the invention as to whether or not such an imbalance is present, a faulty operation of the installation can be avoided.

In embodiments, the ice buildup quantity relates to an ice mass and/or to an ice volume and/or to an ice layer thickness. Preferably, the ice buildup quantity relates to an ice mass and/or to an ice volume in the region of the rotor blade tip and/or to an ice layer thickness in the region of the rotor blade tip. It is possible to output the derived ice mass, for example in kilograms, and/or it is possible to output the derived ice volume and/or it is possible to indicate the derived thickness of an ice layer.

In embodiments, the method described herein is used to determine the operating parameters of a rotor blade de-icing device that are required for a de-icing process. By way of example, the startup time of such a rotor blade de-icing device can be determined on the basis of the derived value for the ice buildup quantity for a satisfactory de-icing result with a low energy outlay, for example if it is determined that a maximum value for an admissible ice mass is exceeded. By way of example, the shutdown time for such a rotor blade de-icing device can be determined, for example if it is determined that a minimum value for an admissible ice mass is undershot.

In embodiments, the method as described here is used at a plurality of wind turbines of a wind farm and said method further includes determining the respective value for the ice buildup quantity at each wind turbine of the plurality of wind turbines; comparing the values; determining a hazard indicator for an ice buildup for at least one wind turbine of the plurality of wind turbines from the comparison.

By way of example, installations that are particularly at risk of an ice buildup within a wind farm can be identified by virtue of comparing the ice buildup quantities of the individual installations. Particularly if the installations within the wind farm are exposed to substantially the same conditions, this allows targeted countermeasures to be put in place at installations at risk of an ice buildup, for example, e.g. by a timely activation of a rotor blade de-icing device in a targeted manner at these relevant installations. This can contribute to an energy-efficient operation.

Figure 2:
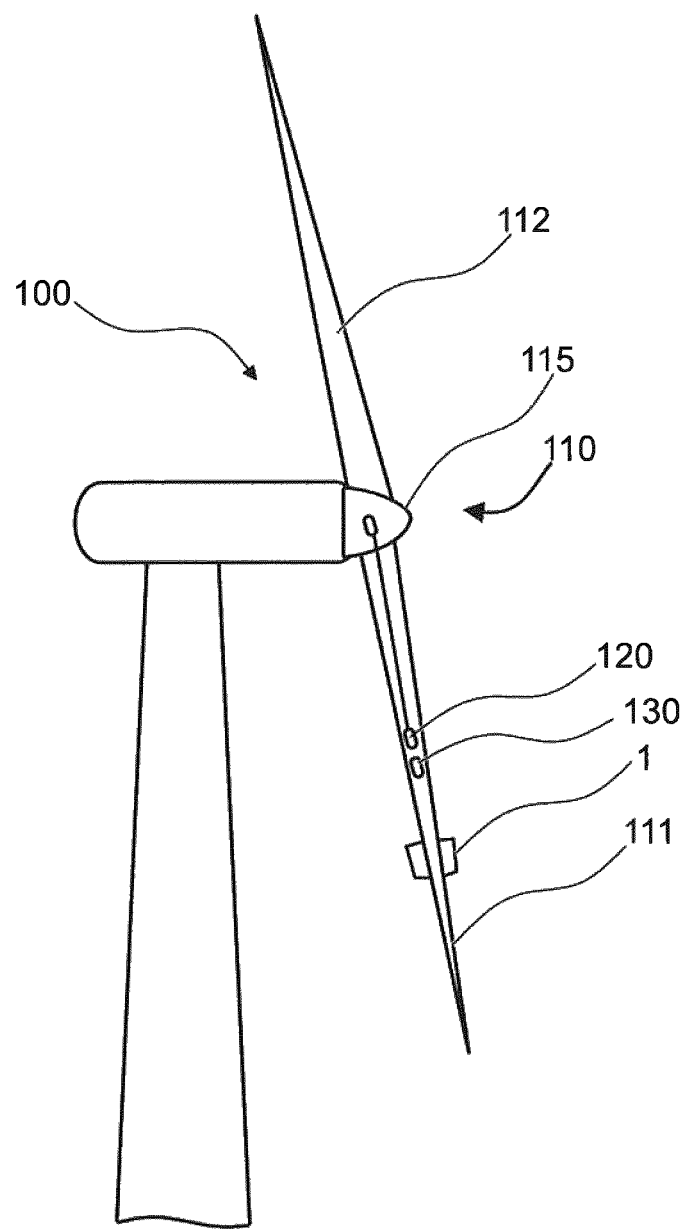
FIG. 2 shows a schematic illustration of a wind turbine, in which the method according to one of the embodiments described herein can be used.

FIG. 2 shows a wind turbine 100 in an exemplary manner, the method described herein being able to be used thereon. The wind turbine comprises a rotor 115, at the rotor hub 110 of which three rotor blades are attached, a first rotor blade 111 and a second rotor blade 112 of which are shown in the side view of FIG. 2. For an improved illustration, the operating means described below are only illustrated on the first rotor blade 111; however, they can also be present on further rotor blades or on all rotor blades.

An ice buildup 1 is schematically illustrated in the region of the rotor blade tip. The vibrations in the rotor blade are captured by means of a rotor blade sensor 120 which, according to the embodiment, is configured as a vibration sensor. Further, a rotor blade de-icing device 130 is provided. The rotor blade de-icing device 130 can extend over large portions of the respective rotor blade 111, 112, or substantially over the entire extent thereof.

Figure 3:
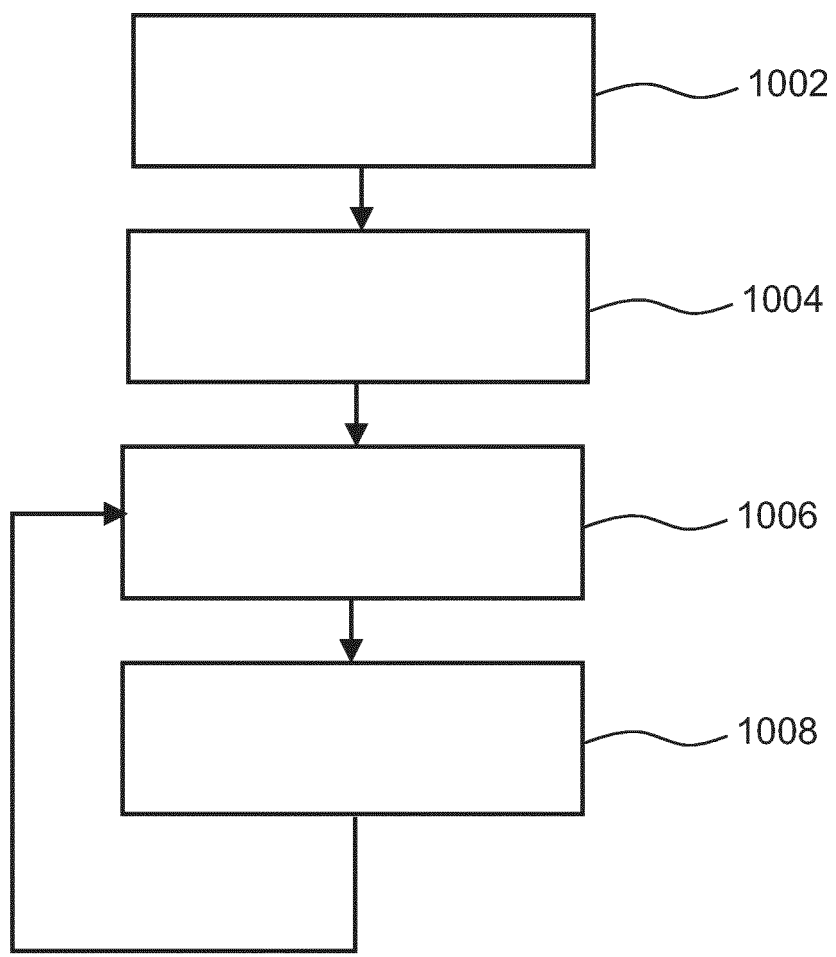
FIG. 3 shows a flowchart of a method for predicting the accumulation of ice on a rotor blade of a wind turbine according to an embodiment of the invention.

FIG. 3 shows a flowchart of a method for determining a value for an ice buildup quantity on at least one rotor blade 111, 112 of the wind turbine 100.

A base value G for at least one natural frequency of the rotor blade 111, 112 when vibrations are excited in the ice-buildup-free state is determined in a step 1002.

A shift base factor for a shift of the at least one natural frequency in relation to the ice-buildup-free state in the case of an ice buildup quantity that has been increased by a certain amount is determined in a subsequent step 1004 of the method.

In a subsequent step 1006 of the method, a measurement value or measurement value curve of a measurement variable suitable for identifying the current natural frequencies of the rotor blade 111, 112 is captured and the current natural frequencies of the rotor blade 111, 112 are identified directly or indirectly from the measurement value or from the measurement value curve.

In a subsequent step 1008 of the method, a current shift factor is derived by comparing the current natural frequencies to the base value G, the current shift factor is compared to the shift base factor and a value for the ice buildup quantity is derived on the basis of the comparison.

After step 1008, there is a return to step 1006.

It is pointed out that the aspects and embodiments described herein are combinable with one another in appropriate fashion and that individual aspects can be omitted where reasonable and possible within the scope of action by a person skilled in the art. Developments and extensions to the aspects described herein are known to a person skilled in the art.

The invention claimed is:

1. A method for determining a value for an ice buildup quantity on at least one rotor blade of a wind turbine, comprising:
   determining a base value for at least one natural frequency of the rotor blade when vibrations are excited in an ice-buildup-free state;
   determining a shift base factor for a shift of the at least one natural frequency in relation to the ice-buildup-free state in the case of an ice buildup quantity that has been increased by a specific value;
   capturing a measurement value or a measurement value curve of a measurement variable that is suitable for identifying the current natural frequencies of the rotor blade, and identifying the current natural frequencies of the rotor blade;
   deriving a current shift factor by comparing the current natural frequencies to the base value;
   comparing the current shift factor to the shift base factor;
   deriving a value for the ice buildup quantity on the basis of the comparison;
   setting a threshold value that specifies the maximum possible ice buildup quantity on the rotor blade;
   determining whether or not the derived value for the ice buildup quantity exceeds the threshold value; and
   if the threshold value being exceeded is determined:
      determining that an erroneous value was determined for the value of the ice buildup.

2. The method as claimed in claim 1,
wherein determining the base value comprises capturing the measurement value or the measurement value curve of the measurement variable in the ice-buildup-free state; and/or wherein determining the base value comprises a simulation of the natural frequency of the rotor blade in the ice-buildup-free state.

3. The method as claimed in claim 1,
wherein the specific value of the increased ice buildup quantity is 50 kg or less.

4. The method as claimed in claim 1,
wherein the measurement variable is a vibration curve in or on the rotor blade and wherein the current natural frequencies are derived from a frequency characteristic of the vibration curve.

5. The method as claimed in claim 1,
wherein the measurement variable is captured at a plurality of measurement points or in a plurality of measurement regions on or in the rotor blade.

6. The method as claimed in claim 1,
wherein the ice buildup quantity relates to an ice mass and/or to an ice volume and/or to an ice layer thickness;
wherein the ice buildup quantity preferably relates to an ice mass and/or to an ice volume in the region of the rotor blade tip and/or to an ice layer thickness in the region of the rotor blade tip.

7. The use of the method as claimed in claim 1 for determining the operating parameters of a rotor blade de-icing device that are required for a de-icing process.

8. The use of the method as claimed in claim 1 for a plurality of wind turbines of a wind farm, comprising:
determining the respective value for the ice buildup quantity at each wind turbine of the plurality of wind turbines;
comparing the values;
determining a hazard indicator for an ice buildup for at least one wind turbine of the plurality of wind turbines from the comparison.

9. The method as claimed in claim 1, wherein the specific value of the increased ice buildup quantity is approximately 10 kg.

10. A method for determining a value for an ice buildup quantity on at least one rotor blade of a wind turbine, comprising:
determining a base value for at least one natural frequency of the rotor blade when vibrations are excited in an ice-buildup-free state;
determining a shift base factor for a shift of the at least one natural frequency in relation to the ice-buildup-free state in the case of an ice buildup quantity that has been increased by a specific value;
capturing a measurement value or a measurement value curve of a measurement variable that is suitable for identifying the current natural frequencies of the rotor blade;
identifying the current natural frequencies of the rotor blade;
deriving a current shift factor by comparing the current natural frequencies to the base value;
comparing the current shift factor to the shift base factor;
deriving a value for the ice buildup quantity on the basis of the comparison,
wherein one value for the ice buildup quantity is determined in each case on at least two rotor blades of the wind turbine, further comprising:
comparing the values for the respective ice buildup quantity; and
determining by means of the comparison whether or not the imbalance of the rotor of the wind turbine exceeds a value that is set or settable in advance.

11. A method for determining a value for an ice buildup quantity on at least one rotor blade of a wind turbine, comprising:
determining a base value for at least one natural frequency of the rotor blade when vibrations are excited in an ice-buildup-free state;
determining a shift base factor for a shift of the at least one natural frequency in relation to the ice-buildup-free state in the case of an ice buildup quantity that has been increased by a specific value;
capturing a measurement value or a measurement value curve of a measurement variable that is suitable for identifying the current natural frequencies of the rotor blade; identifying the current natural frequencies of the rotor blade;
deriving a current shift factor by comparing the current natural frequencies to the base value;
comparing the current shift factor to the shift base factor; and
deriving a value for the ice buildup quantity on the basis of the comparison,
wherein the specific value of the increased ice buildup quantity is 20 kg or less.

* * * * *